United States Patent
Kolmanovsky et al.

(10) Patent No.: US 6,314,735 B1
(45) Date of Patent: Nov. 13, 2001

(54) CONTROL OF EXHAUST TEMPERATURE IN LEAN BURN ENGINES

(75) Inventors: Ilya Vladimir Kolmanovsky, Ypsilanti; Julia Helen Buckland, Dearborn; Jing Sun, Bloomfield, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/511,594

(22) Filed: Feb. 23, 2000

(51) Int. Cl.$^7$ ............................................. F02D 23/00
(52) U.S. Cl. ............................. 60/602; 60/605.2; 415/47
(58) Field of Search ....................... 60/600, 602, 605.2, 60/611; 415/47, 48

(56) References Cited

U.S. PATENT DOCUMENTS

| | | |
|---|---|---|
| 3,079,127 * | 2/1963 | Rowlett et al. ..................... 415/48 |
| 3,928,971 | 12/1975 | Spath . |
| 4,324,526 * | 4/1982 | Berchtold et al. .................. 415/48 |
| 4,404,804 | 9/1983 | Tadokoro et al. . |
| 4,415,307 * | 11/1983 | Fortmann ........................... 415/48 X |
| 4,553,387 | 11/1985 | Mayer . |
| 4,756,285 | 7/1988 | Pischinger . |
| 4,835,963 | 6/1989 | Hardy . |
| 5,021,227 | 6/1991 | Kobayashi et al. . |
| 5,050,376 | 9/1991 | Stiglic et al. . |
| 5,211,010 | 5/1993 | Hirota . |
| 5,267,829 * | 12/1993 | Schmidt et al. ..................... 415/48 |
| 5,381,659 | 1/1995 | Loving et al. . |
| 5,669,756 * | 9/1997 | Brasz et al. ..................... 415/48 X |
| 5,778,674 * | 7/1998 | Kimura .......................... 60/602 X |

FOREIGN PATENT DOCUMENTS

| | | |
|---|---|---|
| 0040217 | 3/1977 | (JP) . |
| 0286817 | 11/1990 | (JP) . |
| 405263628 A | 10/1993 | (JP) . |

\* cited by examiner

Primary Examiner—Hoang Nguyen
(74) Attorney, Agent, or Firm—Allan J. Lippa

(57) ABSTRACT

A method (100) and system for actively controlling the temperature of engine (10) exhaust gas entering an aftertreatment device and thereby controlling undesirable emissions. Through control of the turbine blade position of a variable geometry turbocharger (16), the temperature of the exhaust gas entering the aftertreatment device is maintained within the operating temperature window for the device, and at the same time, achieves the fuel economy benefits associated with turbocharging.

36 Claims, 4 Drawing Sheets

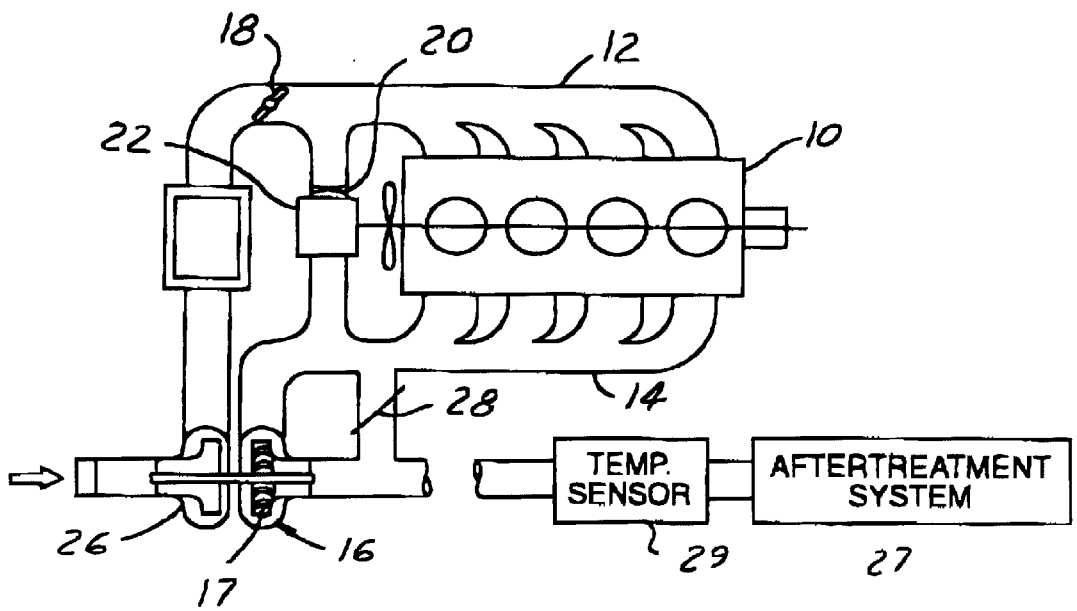
FIG. 1
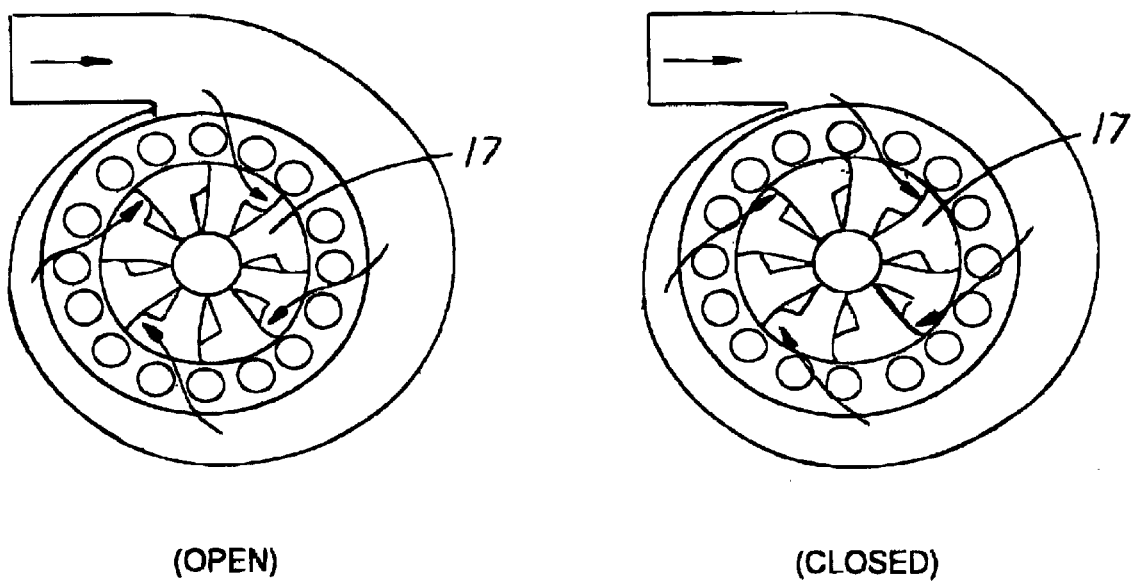
(OPEN)
FIG. 1A
(CLOSED)
FIG. 1B

CONTROL OF EXHAUST TEMPERATURE IN LEAN BURN ENGINES

FIELD OF THE INVENTION

The present invention relates generally to controlling the exhaust temperature of stratified direct injection and other lean burn engines in order to achieve desirable emission controls, and more particularly to using a variable geometry turbocharger to control the exhaust temperature.

BACKGROUND OF THE INVENTION

To achieve $NO_x$ control in lean burn engines, exhaust after-treatment systems have included an additional three-way catalyst, often referred to as a lean $NO_x$ trap (LNT). Presently, however, the performance of $NO_x$ trap technology is limited in several respects. $NO_x$ trap performance is affected by the operating temperature and requires a relatively narrow temperature-operating window. At temperatures outside this window, the device will not operate efficiently and $NO_x$ emissions will increase. Exposure to high temperature will also result in permanent degradation of the $NO_x$ trap capacity.

A current approach to controlling the temperature of the exhaust gas entering aftertreatment devices implements a variable geometry exhaust system having two exhaust paths. When the temperature is high, a valve sends the exhaust gas down a long path from the engine to the aftertreatment device, which provides additional cooling primarily by convection. Otherwise, the exhaust gas follows a shorter path that provides considerably less cooling. This system has limited flexibility, and is difficult to package in a limited space. It also adds cost and complexity to the emissions system, without significant additional benefits.

Governmental regulations of emissions are becoming more stringent. The efficiency of catalysts is temperature dependent. Thus, there exists a need for close control of the temperature of an exhaust after-treatment system to provide an effective means of reducing undesirable emissions.

SUMMARY OF THE INVENTION

It is an object of the present invention to actively enhance engine performance and improve fuel economy and emissions. It is another object of the present invention to use a variable geometry turbocharger to control exhaust temperature for that purpose.

It is a further object of the present invention to provide a control strategy for adjusting the temperature of the exhaust gas entering the aftertreatment device by carefully controlling the turbine inlet vane position.

The foregoing and other objects and advantages are achieved through the use of electronically controlled, variable position turbine inlet vanes in a variable geometry turbocharger. The turbine inlet vane position can control the amount of energy that is extracted and therefore control the temperature of the exhaust gas exiting the turbine. Through careful control of the turbine inlet vane position, the temperature of the exhaust gas entering the aftertreatment device may be maintained within the device operating temperature window to reduce emissions and realize a fuel economy benefit achieved through turbocharging.

One advantage of the present invention is that it reduces emissions and improves fuel economy. Other features and advantages of the present invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention. In the drawings:

FIG. 1 is a schematic diagram of an engine system of the present invention having a variable geometry turbocharger;

FIG. 1A is a front view of the variable geometry turbocharger having vanes in an open position;

FIG. 1B is a front view of the variable geometry turbocharger having vanes in a closed position;

DESCRIPTION OF THE PREFERRED EMBODIMENT(S)

Figure 2:
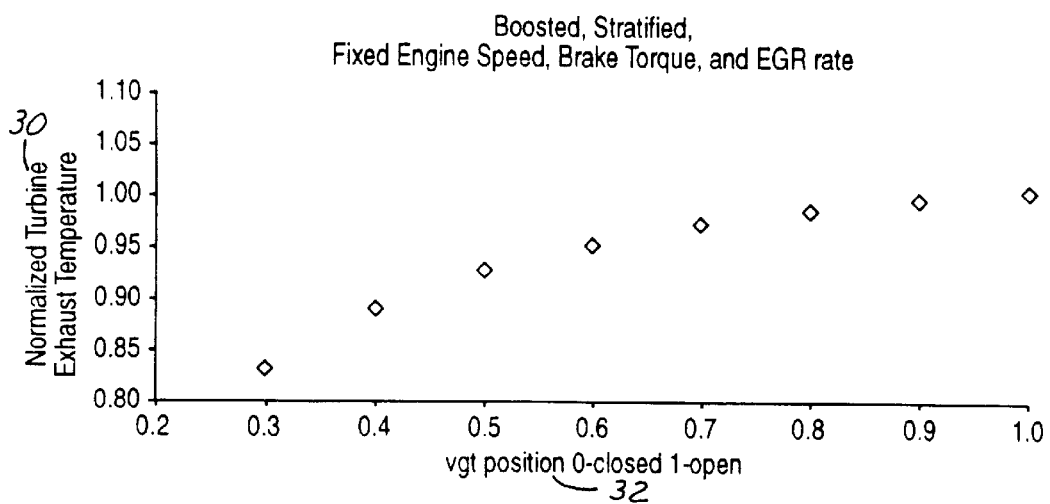
FIG. 2 is a graph of an example of the normalized turbine exhaust temperature for turbine inlet vane positions between open and closed during stratified combustion.

FIG. 1 is a depiction of a system according to the present invention in use on an engine 10. The engine 10 is preferably a direct injection stratified charge (DISC) engine and has an intake manifold 12, an exhaust manifold 14, a variable geometry turbocharger (VGT) 16, a throttle 18, an exhaust gas re-circulation (EGR) valve 20, an EGR cooler 22, a turbocharger cooler 24, a compressor 26, and an optional wastegate 28. It should be noted that the system depicted in FIG. 1 is for example purposes only, and that numerous variations can be implemented without departing from the scope of the present invention. In general, the invention is applicable to any spark ignition engine and compression ignition engine. For example, while a DISC engine 10 is represented in FIG. 1, it is possible to implement the VGT in conjunction with a diesel engine to achieve results similar to that of the DISC engine.

The VGT makes use of the energy in the high temperature engine exhaust gas to provide additional air to the intake manifold 12 by way of the turbine 16 and compressor 26. Typically, the compressor 26 increases air density allowing more air to flow into the intake manifold 12 and the engine 10. The increase in air is used in conjunction with an increase in fuel to increase the power output of the engine 10. The excess air can also be used to allow the engine to operate in stratified mode conditions that would otherwise be impossible without the turbo charger, because of an insufficient air supply.

With a VGT, the inlet geometry (inlet area and flow angle) can be optimized over a wide range of engine operating conditions. An example is the VNT-15 (variable nozzle turbocharger) from Garrett/Allied Signal. The variable nozzle angle determines both the inlet area as well as the flow angle and is controlled by a vacuum regulator.

The temperature of the exhaust gas exiting the turbine 16 is less than that exiting the engine 10. A VGT has electronically controlled variable position inlet vanes 17 that allow control of the amount of energy extracted and therefore, the temperature of the exhaust gas exiting the turbine. Through careful control of the position of the turbine inlet vanes 17, shown open in FIG. 1A and closed in FIG. 1B, the temperature of the gas exiting the turbine, which may be measured by a temperature sensor 29 in FIG. 2, may be maintained within the operating range of an aftertreatment device 27 in FIG. 1 (not shown in 1A or 1B) thereby improving emissions.

The temperature control system of the present invention provides flexibility and control that is not available with the current method of routing exhaust gas into one of two paths. Additionally, the implementation of a VGT 16 provides fuel economy benefits. A VGT 16 can extend the stratified operating regime to higher loads and engine speeds thereby improving fuel economy. Homogeneous lean operation is extended to higher loads and engine speeds, likewise improving fuel economy. The VGT 16 significantly increases power density which provides a fuel economy benefit. Also, the VGT provides both low and high speed benefits to torque and power, compared to a fixed geometry turbocharger.

For engines operating with stratified combustion, brake torque is not very sensitive to changes in the air-to-fuel ratio at a constant fueling rate. Therefore, changes in the turbine inlet vane position to control the temperature of the exhaust gas exiting the turbine does not create a need for significant changes in fuel or spark to maintain the engine torque.

Figure 3:
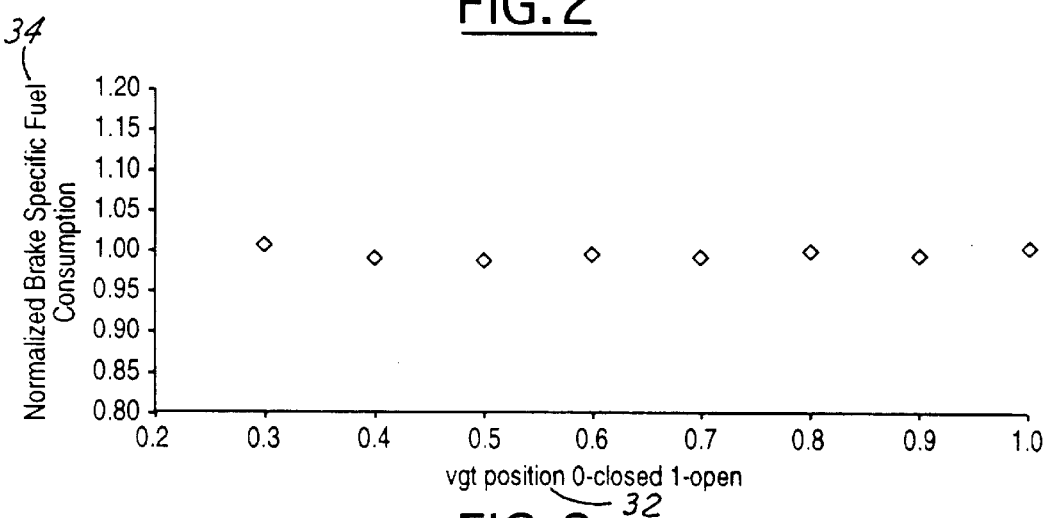
FIG. 3 is a graph of an example of the normalized brake specific fuel consumption for turbine inlet vane positions between open and closed during stratified combustion.
Figure 4:
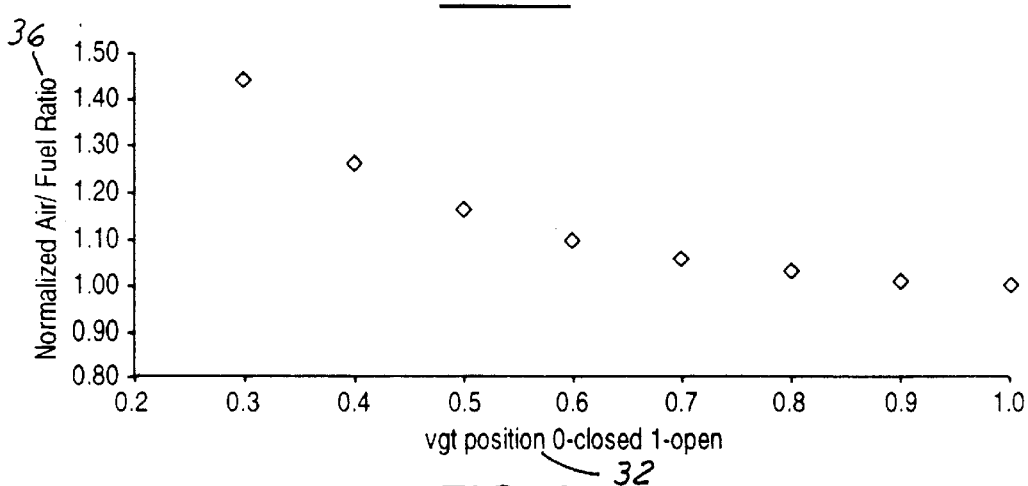
FIG. 4 is a graph of an example of the normalized air/fuel ratio for turbine inlet vane positions between open and closed during stratified combustion.

For example, FIGS. 2 through 4 represent a simulation of a boosted engine operating with stratified combustion having fixed engine speed, brake torque and EGR rate. FIG. 2 depicts the normalized turbine exhaust temperature 30 in relation to the position 32 of the VGT inlet vanes from a closed position at the origin of the graph to a fully open position, represented by 1.0, on the x-axis of the graph. FIG. 3 demonstrates the normalized brake specific fuel consumption 34 and how it remains steady as the VGT position 32 moves from a closed position to fully open. FIG. 4 shows the relationship between the normalized air-to-fuel ratio 36 and the VGT position 32. From FIGS. 2 through 4 it is clear that there is no significant impact on fuel economy when using the VGT for exhaust temperature control.

Figure 5:
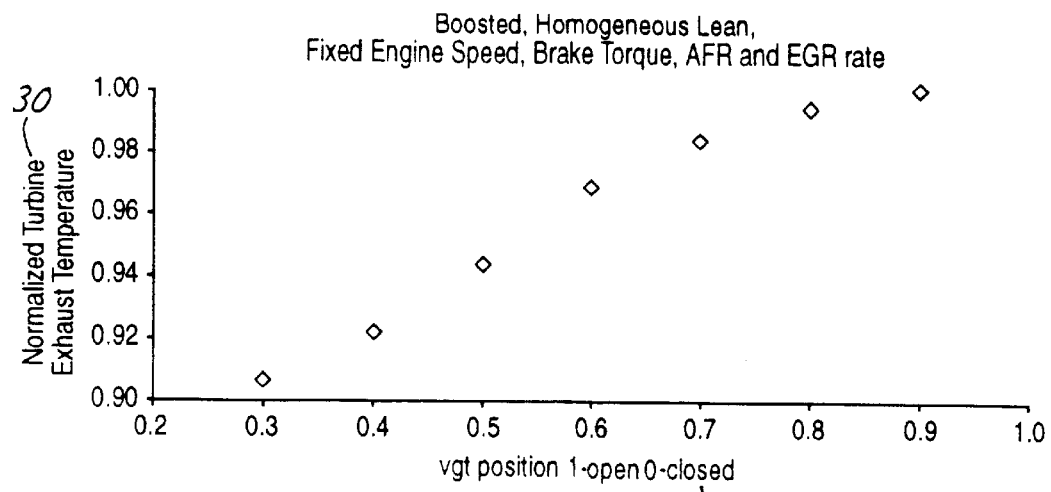
FIG. 5 is a graph of an example of the normalized turbine exhaust temperature for turbine inlet vane positions between open and closed during homogeneous lean burn.

For homogeneous lean burn applications, the throttle is used to maintain a desired air-to-fuel ratio and torque regardless of the VGT position. This can be explained with reference to FIG. 5 which represents the case in which turbine exhaust gas temperature 30 rises as the turbine inlet vane position 32 moves in the direction of more open. If the exhaust gas temperature exceeds a predetermined upper limit required by the aftertreatment device, the turbine inlet vanes can be moved to a more closed position, cooling the exhaust gas. Closing the turbine inlet vanes will lead to an increase in the airflow out of the compressor. Therefore, the throttle must be closed to maintain the desired air-to-fuel ratio and torque.

Conversely, if the exhaust gas temperature drops below a predetermined lower limit, the turbine inlet vanes are opened to increase the temperature. The throttle must be opened to maintain the desired air-to-fuel ratio.

It should be noted that the relationship between the turbine inlet vane positions and the temperature of the exhaust gas described above is specific to the DISC engine used in the present example. It is possible that with other types of engines, the temperature control/inlet vane position relationship is reversed for a certain range of operating conditions. For example, at some conditions in a diesel engine (not shown), it may be that the exhaust gas temperature is decreased by opening the inlet vane position and increased by closing the inlet vane position. Regardless of whether opening the vanes increases or decreases the exhaust gas temperature, the movement of the vane position effects the exhaust gas temperature in a manner that allows control of the exhaust gas temperature.

Figure 6:
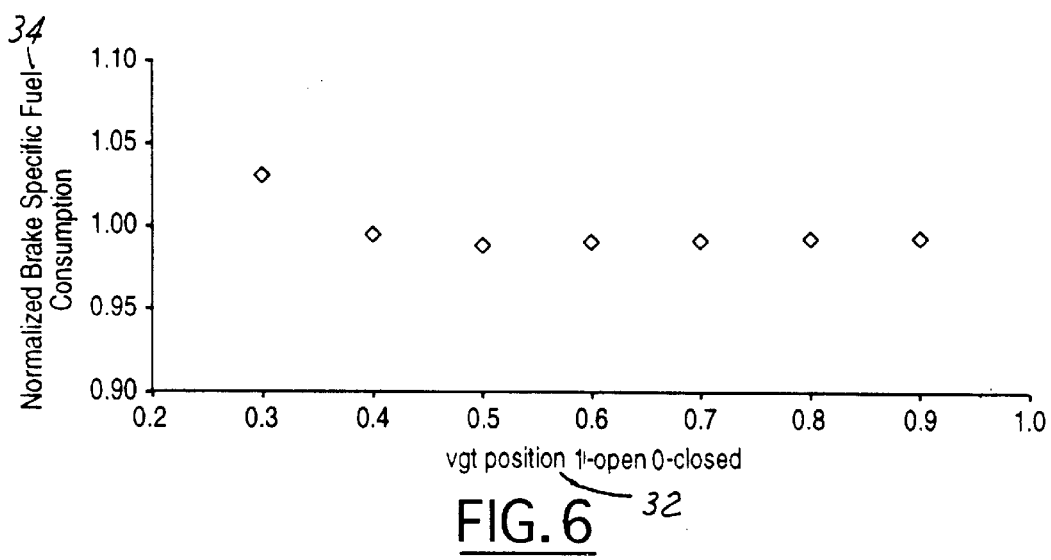
FIG. 6 is a graph of an example of the normalized brake specific fuel consumption for turbine inlet vane positions between open and closed during homogeneous lean burn.
Figure 7:
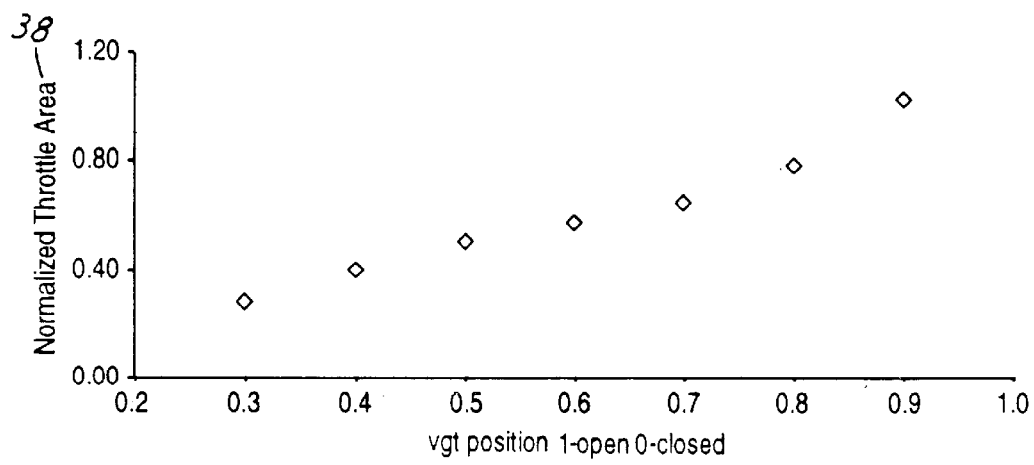
FIG. 7 is a graph of an example of the normalized throttle area for turbine inlet vane positions between open and closed during homogeneous lean burn.

FIG. 6 is a graph of the normalized brake specific fuel consumption 34 relative to the VGT position 32. FIG. 7 represents the adjustments necessary to the throttle 38, as the VGT position 32 changes, in order to maintain the appropriate air-to-fuel-ratio.

Figure 8:
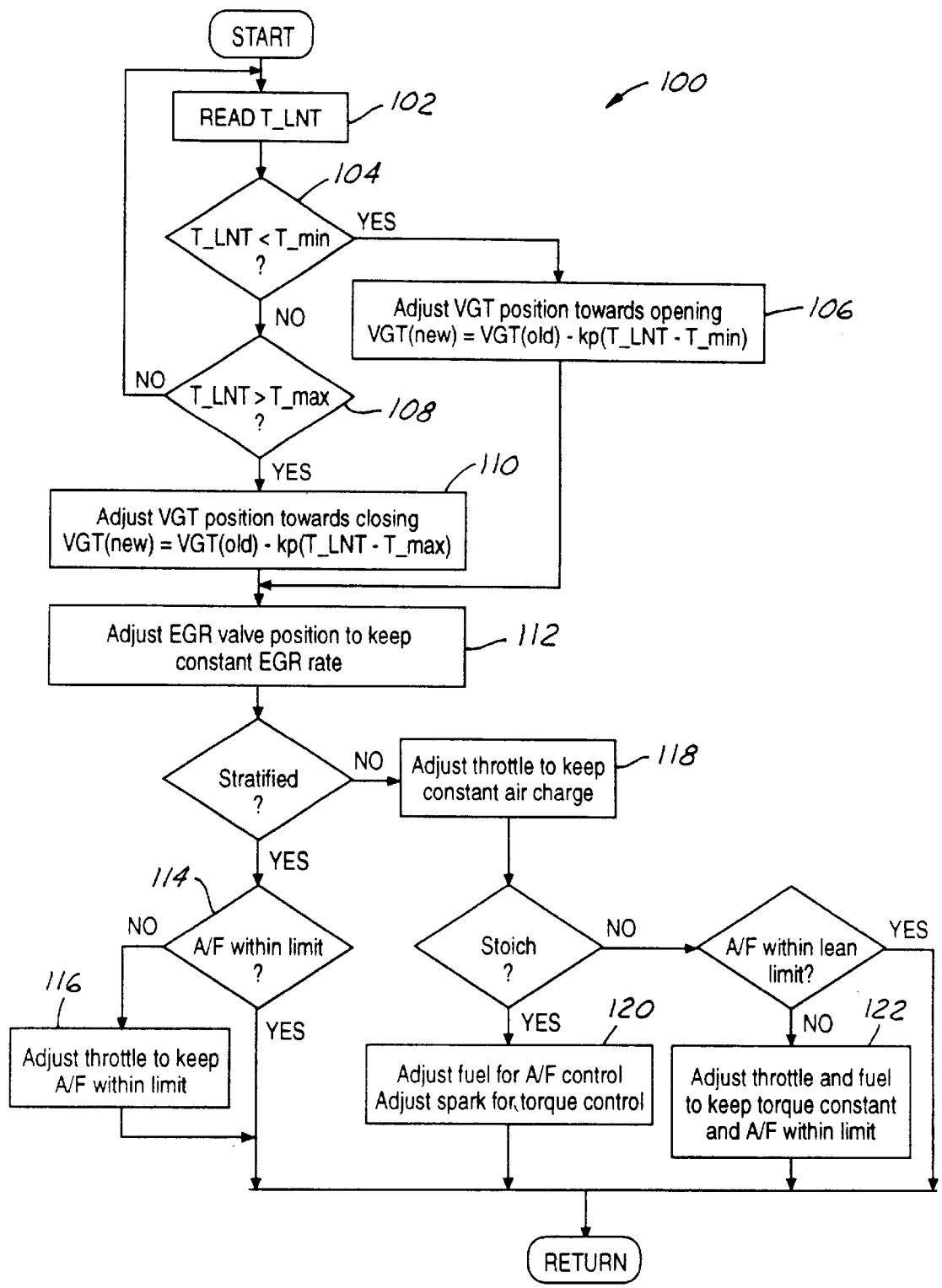
FIG. 8 is a flow chart of the method of the present invention.

The control strategy 100 of the present invention is illustrated in flow chart form in FIG. 8. It should also be noted that while the control strategy is described herein with specific reference to a particular engine, it is also possible to use other engines, which may or may not reverse the relationship between the inlet vane position and the exhaust gas temperature.

According to the method of the present invention, the temperature of the aftertreatment device, an LNT in the present example, is either estimated or read 102 from a temperature sensor or other suitable device. If the temperature of the LNT is below a predetermined minimum temperature 104, the VGT inlet vanes are adjusted to a more open position 106. If the temperature of the LNT is greater than the predetermined minimum limit, it is determined if the LNT temperature is greater than a predetermined maximum limit 108. If not, the strategy cycles back to read the temperature of the LNT. When the LNT temperature is greater than the predetermined maximum limit, the VGT inlet vanes are adjusted towards a more closed position 110. After re-positioning the VGT inlet vanes, the EGR valve must be re-positioned 112 to maintain a constant EGR rate.

For stratified operation, the air-to-fuel ratio is maintained 114 within a predetermined limit. If the ratio is within the limit, the control strategy begins again by cycling back to start. If the ratio is outside of the limit, the throttle is adjusted 116 to keep the air-to-fuel ratio within the limit.

In operation other than stratified conditions, the throttle is adjusted 118 to maintain a constant air charge. When the engine is operating at stoichiometry, the fuel is adjusted for air-to-fuel ratio control and the spark is adjusted for torque control 120. Outside stoichiometry, the throttle is adjusted to maintain the air-to-fuel ratio and thus maintain the torque. If the torque is insensitive to air-to-fuel ratio in some homogeneous lean operating range, the adjustment for throttle will be used only to maintain the air-to-fuel ratio within the lean limit.

In some situations it is necessary to minimize heat losses in the exhaust gas before it reaches the aftertreatment device. For example, this is necessary during cold start, low speed and low torque, or LNT desulfation. It is possible to adjust the turbine inlet vanes to their fully open position, or implement a wastegate 28 as shown in FIG. 1. Normally, the exhaust gas passes through the turbine to drive the compressor to compress fresh air. The wastegate 28 allows exhaust gas to bypass the turbine.

The system and method of the present invention actively controls the temperature of engine exhaust gas entering the aftertreatment device. Through careful control of the turbine inlet vane position, the temperature of the exhaust gas entering the aftertreatment device is maintained within the operating temperature window for the device, and at the same time, achieves the fuel economy benefits associated with turbocharging.

It is to be understood that the present invention is not limited to the embodiments described herein. The invention covers all alternatives, modifications, and equivalents, as may be included within the spirit and scope of the appended claims. In particular, the system and method of the present invention can help alleviate temperature issues associated with aftertreatment that arise in diesel engines due to aging.

What is claimed is:

1. An internal combustion engine having an exhaust into an aftertreatment system comprising:
   an intake manifold path;
   a compressor in said intake manifold path;
   an exhaust manifold path;
   a turbine in said exhaust manifold path, said turbine having inlet vanes variable between an open position and a closed position for controlling the temperature of an exhaust gas exiting said turbine and entering the aftertreatment system;
   wherein during periods of stratified combustion in said internal combustion engine, changes in said inlet vane positions does not affect engine torque; and
   wherein during periods of homogeneous lean burn in said internal combustion engine, changes in engine operating conditions due to changes in said inlet vane positions are counteracted by altering other engine variables to maintain desired engine operating conditions independent of said inlet vane positions.

2. The engine as claimed in claim 1 further comprising said turbine inlet vanes movable from a first predetermined position to a second predetermined position that is more open than said first predetermined position to increase said exhaust gas temperature.

3. The engine as claimed in claim 1 further comprising said turbine inlet vanes movable from a first predetermined position to a second predetermined position that is more closed than said first predetermined position to decrease said exhaust gas temperature.

4. The engine as claimed in claim 1 further comprising said turbine inlet vanes movable from a first predetermined position to a second predetermined position that is more open than said first predetermined position to decrease said exhaust gas temperature.

5. The engine as claimed in claim 1 further comprising said turbine inlet vanes movable from a first predetermined position to a second predetermined position that is more closed than said first predetermined position to increase said exhaust gas temperature.

6. The engine as claimed in claim 1 wherein said turbine inlet vanes are in a fully open position to maintain said exhaust gas temperature near engine exhaust levels.

7. The engine as claimed in claim 1 wherein a wastegate is positioned in said exhaust path preceding said turbine for bypassing said turbine to maintain said exhaust temperature at engine exhaust levels.

8. The engine as claimed in claim 1 further comprising an exhaust gas recirculation valve positioned in said intake path for maintaining a constant exhaust gas recirculation rate.

9. The engine as claimed in claim 1 further comprising a throttle in said intake path for maintaining a desired air-to-fuel ratio in said engine.

10. An internal combustion engine having an exhaust into an aftertreatment system comprising:
    an intake manifold having a predetermined intake path;
    a throttle positioned in said intake path;
    an exhaust manifold having a predetermined exhaust path;
    a variable geometry turbocharger for controlling temperature of exhaust gas exiting said engine, said variable geometry turbocharger comprising:
      a variable geometry turbine positioned in said exhaust path;
      a compressor positioned in said intake path;
    whereby said turbine inlet vanes are movable between an open position and a closed position, thereby altering the temperature of said exhaust gas exiting the turbine in order to maintain a predetermined temperature of said exhaust gas entering said aftertreatment system;
    wherein during periods of stratified combustion in said internal combustion engine, changes in said inlet vane positions does not affect engine torque; and
    wherein during periods of homogeneous lean burn in said internal combustion engine, changes in engine operating conditions due to changes in said inlet vane positions are counteracted by altering other engine variables to maintain desired engine operating conditions independent of said inlet vane positions.

11. The engine as claimed in claim 10 further comprising said turbine inlet vanes movable from a first predetermined position to a second predetermined position that is more open than said first predetermined position to increase said exhaust gas temperature.

12. The engine as claimed in claim 10 further comprising said turbine inlet vanes movable from a first predetermined position to a second predetermined position that is more closed than said first predetermined position to decrease said exhaust gas temperature.

13. The engine as claimed in claim 10 further comprising said turbine inlet vanes being movable from a first predetermined position to a second predetermined position that is more open than said first predetermined position for reducing said temperature of said exhaust gas.

14. The engine as claimed in claim 10 further comprising said turbine inlet vanes being movable from a first predetermined position to a second predetermined position that is more closed than said first predetermined position for increasing said exhaust gas temperature.

15. The engine as claimed in claim 10 wherein said turbine inlet vanes are in a fully open position to maintain said exhaust gas temperature near engine exhaust levels.

16. The engine as claimed in claim 10 wherein said exhaust path further comprises a wastegate for bypassing said turbine to maintain said exhaust gas temperature at engine exhaust levels.

17. The engine as claimed in claim 10 further comprising an exhaust gas recirculation valve positioned in said intake path for maintaining a constant exhaust gas recirculation rate.

18. The engine as claimed in claim 10 wherein said throttle is adjustable for maintaining a predetermined air-to-fuel ratio in said engine.

19. A method for controlling the temperature of exhaust gas exiting a variable geometry turbine in an engine having a set of system operating conditions comprising the steps of:
    sensing a temperature of exhaust gas within an aftertreatment device;
    determining whether said sensed temperature is within a predetermined temperature range;

using said variable geometry turbine to maintain said exhaust gas temperature within said predetermined temperature range; and adjusting a plurality of system operating variables in order to maintain said set of system operating conditions.

20. The method as claimed in claim 19 wherein said variable geometry turbine is at a first position and step of determining whether said sensed temperature is within a predetermined temperature range further comprises:

determining said sensed temperature is less than a predetermined minimum temperature limit; and adjusting said variable geometry turbine to a more open position than said first position for increasing said exhaust gas to a temperature at least equal to said predetermined minimum temperature limit.

21. The method as claimed in claim 19 wherein said variable geometry turbine is at a first position and step of determining whether said sensed temperature is within a predetermined temperature range further comprises:

determining said sensed temperature is greater than a maximum predetermined temperature limit; and adjusting said variable geometry turbine to a more closed position than said first position for decreasing said exhaust gas temperature at least equal to said predetermined maximum temperature limit.

22. The method as claimed in claim 19 wherein said variable geometry turbine is at a first position and step of determining whether said sensed temperature is within a predetermined temperature range further comprises:

determining said sensed temperature is less than a predetermined minimum temperature limit; and adjusting said variable geometry turbine to a more closed position than said first position for increasing said exhaust gas to a temperature at least equal to said predetermined minimum temperature limit.

23. The method as claimed in claim 19 wherein said variable geometry turbine is at a first position and step of determining whether said sensed temperature is within a predetermined temperature range further comprises:

determining said sensed temperature is greater than a maximum predetermined temperature limit; and adjusting said variable geometry turbine to a more open position than said first position for decreasing said exhaust gas temperature at least equal to said predetermined maximum temperature limit.

24. The method as claimed in claim 19 wherein said step of adjusting a plurality of system operating variables in order to maintain said set of system operating conditions further comprises the step of adjusting an exhaust gas recirculation valve to maintain a constant exhaust gas recirculation rate.

25. The method as claimed in claim 24 for an engine operating in a stratified mode further comprising the step of adjusting a throttle to maintain an air-to-fuel ratio within a predetermined limit.

26. The method as claimed in claim 24 further comprising the steps of:

determining said engine is operating at stoichiometry;

adjusting a throttle for maintaining a constant air charge;

adjusting a fuel supply for maintaining a desired air-to-fuel ratio; and adjusting engine spark for controlling engine torque.

27. The method as claimed in claim 24 further comprising the steps of:

adjusting a throttle for maintaining a constant air charge;

determining said engine is operating within a homogeneous lean air-to-fuel ratio;

re-adjusting said throttle to maintain a constant engine torque; and adjusting a fuel supply to maintain a desired air-to-fuel ratio.

28. A method for controlling the temperature of exhaust gas exiting a variable geometry turbine comprising the steps of:

estimating a temperature of exhaust gas within an aftertreatment device;

determining whether said estimated temperature is within a predetermined temperature range;

using said variable geometry turbine to maintain said exhaust gas temperature within said predetermined temperature range; and adjusting a plurality of engine operating variables in order to maintain said set of system operating conditions.

29. The method as claimed in claim 28 wherein said variable geometry turbine is at a first position and step of determining whether said estimated temperature is within a predetermined temperature range further comprises:

determining said estimated temperature is less than a predetermined minimum temperature limit; and adjusting said variable geometry turbine to a more open position than said first position for increasing said exhaust gas to a temperature at least equal to said predetermined minimum temperature limit.

30. The method as claimed in claim 28 wherein said variable geometry turbine is at a first position and step of determining whether said estimated temperature is within a predetermined temperature range further comprises:

determining said estimated temperature is greater than a maximum predetermined temperature limit; and adjusting said variable geometry turbine to a more closed position than said first position for decreasing said exhaust gas temperature at least equal to said predetermined maximum temperature limit.

31. The method as claimed in claim 28 wherein said variable geometry turbine is at a first position and step of determining whether said estimated temperature is within a predetermined temperature range further comprises:

determining said estimated temperature is less than a predetermined minimum temperature limit; and adjusting said variable geometry turbine to a more closed position than said first position for increasing said exhaust gas to a temperature at least equal to said predetermined minimum temperature limit.

32. The method as claimed in claim 28 wherein said variable geometry turbine is at a first position and step of determining whether said estimated temperature is within a predetermined temperature range further comprises:

determining said estimated temperature is greater than a maximum predetermined temperature limit; and adjusting said variable geometry turbine to a more open position than said first position for decreasing said exhaust gas temperature at least equal to said predetermined maximum temperature limit.

33. The method as claimed in claim 28 wherein said step of adjusting a plurality of system operating variables in order to maintain said set of system operating conditions further comprises the step of adjusting an exhaust gas recirculation valve to maintain a constant exhaust gas recirculation rate.

34. The method as claimed in claim 33 for an engine operating in a stratified mode further comprising the step of adjusting a throttle to maintain an air-to-fuel ratio within a predetermined limit.

35. The method as claimed in claim 33 further comprising the steps of:
   determining said engine is operating at stoichiometry;
   adjusting a throttle for maintaining a constant air charge;
   adjusting a fuel supply for maintaining a desired air-to-fuel ratio; and
   adjusting engine spark for controlling engine torque.

36. The method as claimed in claim 33 further comprising the steps of:
   adjusting a throttle for maintaining a constant air charge;
   determining said engine is operating within a homogeneous lean air-to-fuel ratio;
   re-adjusting said throttle to maintain a constant engine torque; and
   adjusting a fuel supply to maintain a desired air-to-fuel ratio.

* * * * *